Feb. 28, 1928.

F. W. DINE 1,660,376

DRILLING MACHINE

Filed June 28, 1923

2 Sheets-Sheet 1

INVENTOR,
Frank W. Dine,
BY Howard D. Smith,
His ATTORNEY

Feb. 28, 1928.

F. W. DINE 1,660,376

DRILLING MACHINE

Filed June 28, 1923

2 Sheets-Sheet 2

INVENTOR
Frank W. Dine,
BY
Howard D. Smith,
His ATTORNEY

Patented Feb. 28, 1928.

1,660,376

UNITED STATES PATENT OFFICE.

FRANK W. DINE, OF MINSTER, OHIO, ASSIGNOR, BY MESNE ASSIGNMENTS, TO THE NATIONAL AUTOMATIC TOOL COMPANY, OF RICHMOND, INDIANA, A CORPORATION OF INDIANA.

DRILLING MACHINE.

Application filed June 28, 1923. Serial No. 648,234.

This invention relates to new and useful improvements in drilling machines, and has particular reference to a drilling machine in which the driving connection between the train of gearing and the spindle is in close proximity to the work.

It is one of the principal objects of my invention to provide in a drilling machine, means for so mounting the back-gear shaft and spindle gears that one will be on the tool-carrying end of the spindle and the other on a parallel shaft, in order that the driving connection between them may be in proximity to the work rather than at the upper end of the spindle. This eliminates the torque or twist to which the spindle is subjected when it is driven from its upper end, and places the back-gear shaft and spindle gears in a position in front of the machine where they may be readily inserted and removed. Furthermore, such a construction, allows the spindle a much greater travel than it has in other drilling machines where a high driving connection limits the descent of the thrust bearing.

Other important and incidental objects will be brought out in the following specification, and particularly set forth in the subjoined claims.

Figure 1:
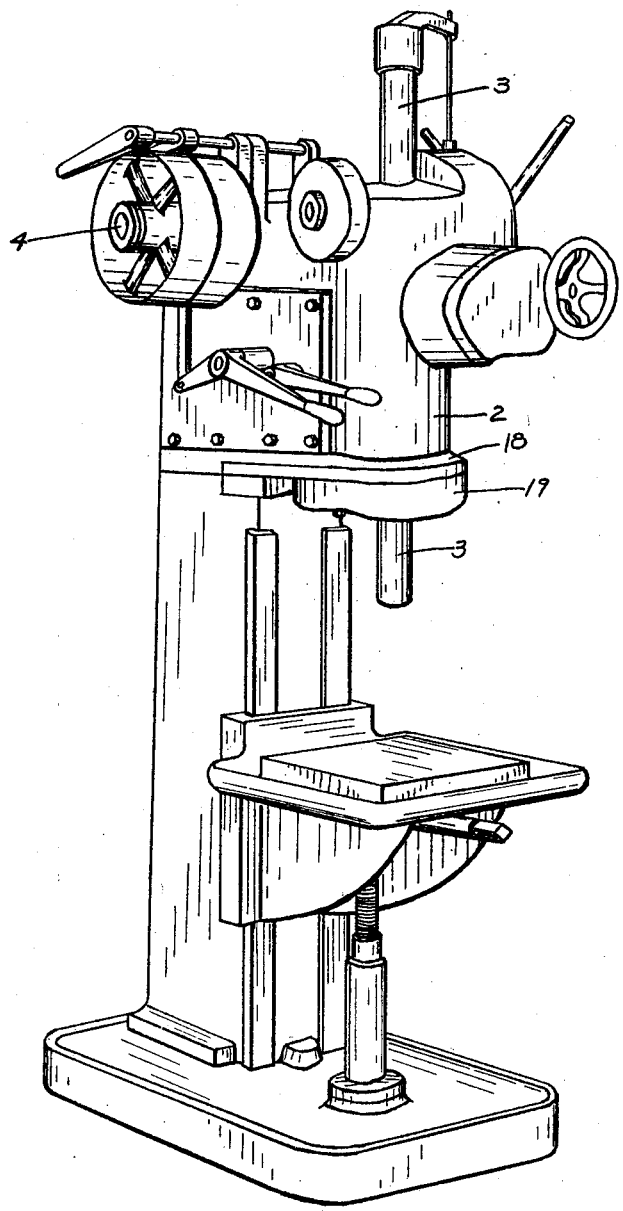
Figure 2:
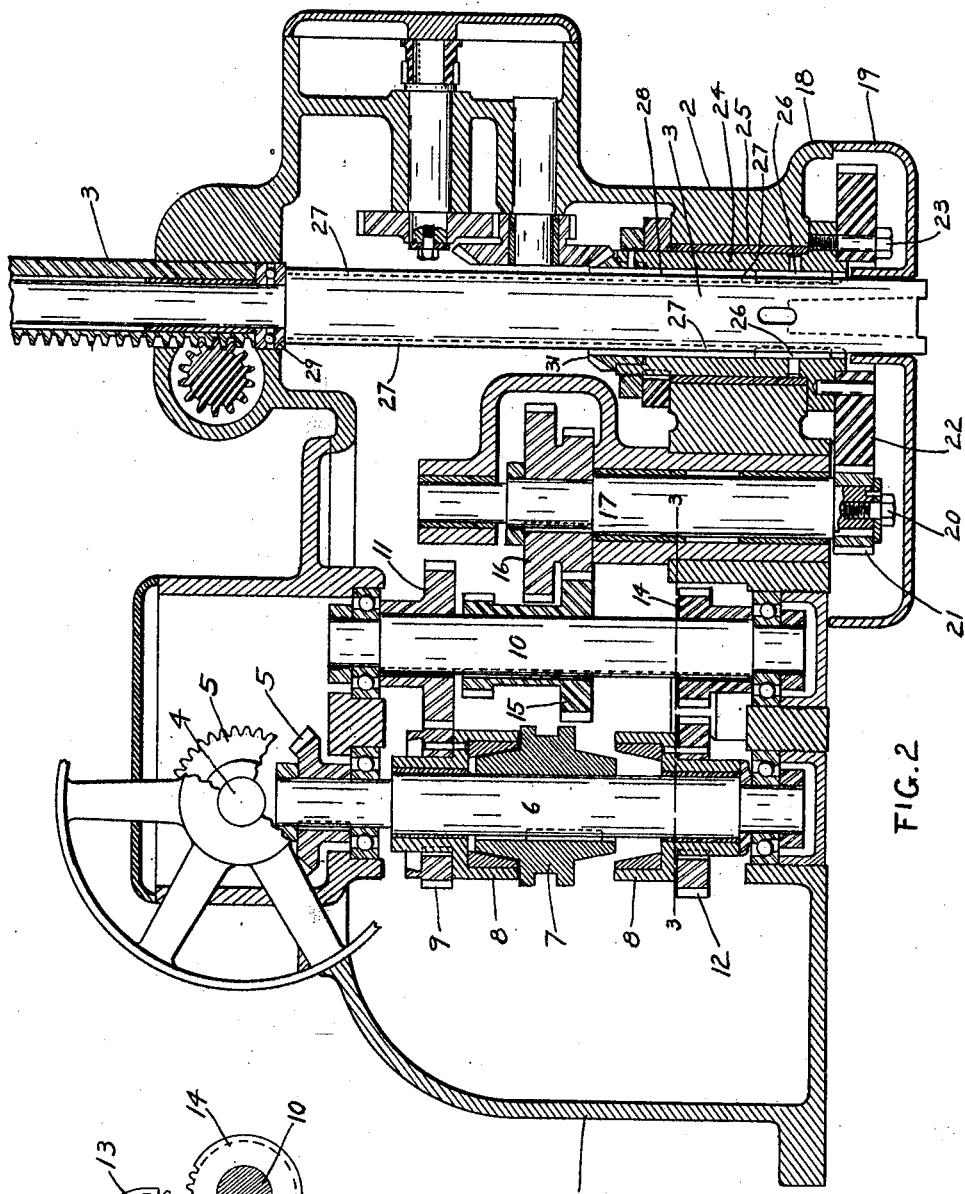
Figure 3:
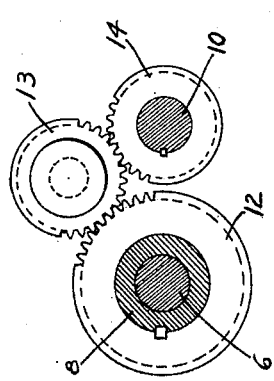

In the accompanying drawings, Figure 1 is a perspective view of my improved drilling machine. Figure 2 is a longitudinal sectional view taken through the head of the machine. And Figure 3 is a cross sectional view taken on the line 3—3 of Figure 2, showing the reverse gears.

Throughout the specification and drawings, similar reference characters denote corresponding parts.

Referring to the accompanying drawings for a detailed description of the form of embodiment of my invention illustrated therein, the numeral 1 designates a drilling machine housing having a front bearing portion 2 for a spindle 3. The latter is driven from a power-driven pulley shaft 4 through a train of gearing and suitable shafting now to be described.

Referring to Figure 2, the pulley shaft 4 drives, through miter gears 5, 5, a shaft 6 on which there is keyed a clutch driving member 7. Surrounding the latter is a clutch driven member 8 to which there is secured a gear 9 that is put in motion when the clutch is engaged.

Mounted on a second shaft 10 is a gear 11 which is engaged by the gear 9 to rotate the shaft 10 in one direction. It is rotated in the other direction by a reversing clutch now to be described.

On the lower end of the shaft 6 there is mounted a gear 12 which is in engagement with an intermediate gear 13 that meshes with a gear 14 on the lower end of the shaft 10. (See Figures 2 and 3.) Therefore, by means of the gears 12, 13 and 14 it is possible, when desired, to cause the shaft 6 to drive the shaft 10 in a reverse direction. There is also mounted on the shaft 10 a sliding gear 15 which engages a gear 16 keyed to the back gear shaft 17 to give the machine two mechanical speed changes.

The spindle bearing portion 2 of the housing, which is in the upper front part of the machine, terminates at its lower end in a skirt or flange portion 18 through which the back gear shaft 17 and the spindle 3 project. (See Figure 2.) Removably bolted to the flange portion 18 of said bearing portion, is a flanged or cup-shaped oil-holding member or cover 19.

Secured by a cap screw 20 or other suitable means to the lower end of the back gear shaft 17, is a gear 21 which meshes with a gear 22. The latter is preferably secured by cap screws 23 to a spindle-driving sleeve 24 that is rotatable in a bushing 25 secured in the bearing portion 2 of the housing. Pinned in the sleeve 24 are keys 26 which enter longitudinal grooves 27 in the periphery of the spindle 3 for the purpose of driving the latter.

The gears 21 and 22 are mounted on the shaft 17 and sleeve 24 respectively to rotate within the flanged cover 19, which not only contains oil for the lubrication of these gears, but it may be readily taken off to permit the replacement of them with ease. Furthermore, the location of these gears at the bottom of the spindle bearing portion 2 of the housing, provides a driving connection between the back gear shaft 17 and the spindle 3 that is in close proximity to the work, thus eliminating the torque or twist to which the spindle is incident when driven from its upper end.

The mounting of the gears 21 and 22 at the bottom of the bearing portion 2 of the housing, makes it possible to increase the travel of the spindle, for the bore 28 in the sleeve 24 may be made large enough to receive the ball thrust-bearing 29 at the upper end of the spindle. In other types of machines the engagement of this bearing with the top 31 of the sleeve 24, limits the downward movement of the spindle, but where the gears are mounted at the lower end of the bearing portion 2, the bearing 29 is permitted to descend through the bore 28 in the sleeve until it engages the tops of the keys 26. The travel of the spindle is thus increased an amount equal to the distance between the top of the sleeve and the tops of the keys 26 therein. It is thus seen that the ball thrust-bearing 29 may be carried into the sleeve by the spindle, to lengthen its descent.

Having described my invention, I claim:

1. A machine tool combining a spindle-head providing a main housing; a sleeve journaled in a wall of said housing and having an end projecting therethrough and adapted to have a driven pinion detachably mounted thereon; a feed drive gear secured upon the other end of the sleeve; an adjacent power-driven shaft also journaled in said wall and having its end projecting therethrough and adapted to have a driving pinion detachably secured thereto; a driven and a driving pinion demountably attached to said spindle and shaft respectively; an auxiliary casing enclosing said pinions and detachably secured to said main housing to permit its removal for the purpose of changing said pinions; a spindle translatably passing through said auxiliary casing and through the bore of said sleeve and splined thereto to be driven thereby; and means for translating said spindle.

2. A machine tool combining a drill-head providing a main housing; a sleeve journaled in a wall of said housing and projecting internally and externally thereof; a feeding gear within said housing and mounted on the internal end of said sleeve; a sleeve driving pinion located external of said housing and detachably secured to the external end of said sleeve; a driving shaft journaled in the wall of said housing; an external pinion detachably secured to the outer end of said driving shaft and meshing with said pinion to impart rotation thereto; and a spindle projecting through the bore of said sleeve and translatably splined thereto.

3. A machine tool combining a spindle head providing a main housing; a sleeve journaled in a wall of said housing and having an end projecting therethrough and adapted to have a sleeve-driving pinion detachably mounted thereon; an adjacent power-driven shaft also journaled in said wall and having its end projecting therethrough and adapted to have a driving pinion detachably secured thereto; a pair of pinions demountably attached external of said housing to said spindle and shaft respectively; an auxiliary casing in the nature of an oil-well enclosing said pinions and detachably secured to said main housing to permit its removal for the purpose of changing said pinions, said auxiliary casing providing an oil-retaining port for the passage of a spindle, a spindle translatably passing through the port of said auxiliary casing and through the bore of said sleeve and splined to said sleeve to be driven thereby; and means for translating said spindle.

4. A machine tool combining a drill-head providing a main housing; a sleeve journaled in a wall of said housing and projecting internally and externally thereof; a gear within said housing and mounted on the internal end of said sleeve; a gear-train deriving motion from said gear and located within said main-housing; a pinion located external of said housing and detachably secured to the external end of said sleeve; a driving shaft journaled in the wall of said housing; a pinion located external of said housing and detachably secured to the outer end of said driving shaft and meshing with said first pinion to impart rotation thereto; a spindle projecting through the bore of said sleeve and translatably splined directly to said sleeve, whereby the driving torque will be applied to said spindle at its point of emergence through the wall of said housing; and a shallow casing for said pinions detachably secured to the external face of said wall.

In testimony whereof I have hereunto set my hand this 25th day of June, 1923.

FRANK W. DINE.